United States Patent
Kruse (10) Patent No.: US 8,365,618 B2
(45) Date of Patent: Feb. 5, 2013

(54) SLED TEST APPARATUS

(75) Inventor: Dion Kruse, Alingsas (SE)

(73) Assignee: Autoliv Development AB, Vargarda (SE)

( * ) Notice: Subject to any disclaimer, the term of this patent is extended or adjusted under 35 U.S.C. 154(b) by 85 days.

(21) Appl. No.: 13/011,208

(22) Filed: Jan. 21, 2011

(65) Prior Publication Data

US 2011/0192240 A1    Aug. 11, 2011

(30) Foreign Application Priority Data

Feb. 5, 2010  (EP) .................................. 10250197

(51) Int. Cl.
  *G01N 17/00*  (2006.01)
(52) U.S. Cl. ...................................... 73/865.6
(58) Field of Classification Search .................. None
  See application file for complete search history.

(56) References Cited

U.S. PATENT DOCUMENTS

| | | | | |
|---|---|---|---|---|
| 5,355,716 A | * | 10/1994 | Castelli | .......................... 73/1.39 |
| 6,522,998 B1 | * | 2/2003 | Mazur et al. | ....................... 703/8 |
| 2008/0011047 A1 | * | 1/2008 | Dragan | ........................ 73/12.07 |
| 2008/0034902 A1 | | 2/2008 | Chen et al. | |
| 2008/0121014 A1 | * | 5/2008 | Chen et al. | ................... 73/12.01 |

FOREIGN PATENT DOCUMENTS

| | | |
|---|---|---|
| DE | 19854856 A1 | 12/2000 |
| DE | 102008031659 A1 | 1/2010 |

OTHER PUBLICATIONS

Extended European Search Report for EP 10 25 0197 including the European Search Report and the European Search Opinion, Aug. 2010.

* cited by examiner

*Primary Examiner* — Robert R Raevis
(74) *Attorney, Agent, or Firm* — Harness, Dickey & Pierce, P.L.C.

(57) ABSTRACT

A sled test apparatus for simulating a vehicle crash is configured to simulate a vehicle crash involving an intrusion into the cabin of the vehicle, as occurs, for example, in a so-called "small overlap" or "offset" impact. The apparatus has a sled carriage and a test buck. The sled carriage is mounted for linear movement along a test axis, and the test buck includes a first structure mounted to the carriage for guided movement relative to the carriage. The test buck further includes a second structure mounted to the carriage, and the first structure is configured to move relative to the second structure during the guided movement.

14 Claims, 7 Drawing Sheets

SLED TEST APPARATUS

CROSS-REFERENCE TO RELATED APPLICATIONS

This application claims the benefit and priority of EP 10250197.0, filed Feb. 5, 2010, which application is herein expressly incorporated by reference.

FIELD

The present invention relates to simulated vehicle crash-testing, and more particularly relates to a sled test apparatus for simulating a motor vehicle crash.

BACKGROUND

The statements in this section merely provide background information related to the present disclosure and may not constitute prior art.

Full-vehicle crash testing has been proposed previously, and indeed is still widely used, to reproduce the dynamic conditions of vehicle accidents in a controlled testing environment. These tests involve the destruction of substantially complete motor vehicles and so they are complex and expensive to conduct. Also, engineering analysis typically requires multiple tests to be conducted so that occupant motion and vehicle structure comparisons can be made between tests, thereby requiring several vehicles to be destroyed. Whilst full-vehicle crash tests of this type are still important, it has thus become common to use so-called sled-tests to simulate the conditions of a full-scale crash test in a controlled environment.

A particular advantage of sled testing is that it avoids the need to destroy real vehicles, and can be conducted in a more readily repetitive manner and at significantly reduced cost. Typically, a simulated occupant compartment of a motor vehicle, generally referred to as a "vehicle buck", is mounted to a test sled carriage. The buck and sled carriage are then subjected to decelerations representative of a particular vehicle crash scenario. This controlled deceleration is commonly referred to as a sled pulse and is modelled from accelerometer data obtained from actual full-scale crash tests.

Current sled test apparatus and associated test methods are restricted to the assumption that no deformation of the vehicle structure or intrusion into the occupant compartment (i.e. the cabin space) takes place. The practical effect of this assumption is that in certain crash scenarios the sled test method can provide false crash data. There is therefore a need to provide a sled test apparatus and associated test method which can simulate intrusion into the vehicle cabin.

Document DE102008031659 discloses a carriage for carrying out crash tests on motor subassemblies having a first carrier for carrying a motor vehicle component to be tested, wherein the carriage is designed to be moved relative to a stop unit with the result that the carriage can collide with the stop unit, and wherein the first carrier is movably mounted to the carriage such that it is moved along a predetermined path if the carriage collides with the stop unit.

Document DE19894856 discloses a side impact simulation plant for simulating intrusions and accelerations of vehicle side structures into the vehicle inner as well as the accelerations of an entire vehicle upon a side impact.

Document US2008/0034902 discloses a sled carriage configured to move in the direction of an axis. A platform is attached with the sled carriage and a sled buck is attached with the platform. Upon accelerations of the carriage, the sled buck and platform move relative to the sled carriage.

A passenger car frontal impact involving the engagement of ⅓ or less of the car's full width with another object such as a barrier is generally defined as a "small overlap" (or "offset") impact. Such impacts often result in severe car structure deformations and severe injuries for the nearside occupants. Indeed it has been found that approximately 25% of all fatal frontal accidents involving occupants restrained by safety belts in passenger cars are small overlap impacts of this type, and these often occur on roads with speed limits over 60 km/h.

In frontal impact situations involving larger overlap between the width of the vehicle and the obstacle (for example ⅓ to ½ of the vehicle width), the vehicle structure normally deforms much less relative to the small overlap case. This is because the load distribution area is larger and also because modern passenger cars are generally optimized for this load situation due to being designed in response to data from standard crash tests.

When the longitudinal load transferring structure of the passenger car is not fully engaged with the obstacle upon impact, as would be the case in a small overlap impact, and the resulting deformation of the vehicle structure occurs close to the occupant, there is a significantly increased risk of injury to the occupant from cabin intrusion. In nearside impacts of this type, the car structure in front of the occupant starts to move inwards relative the cabin, and the lower A-pillar of the car which is engaged by the nearside wheel intrudes into the cabin, followed by the upper A-pillar, the crossbeam and the dashboard. The steering wheel, which is connected to the crossbeam or dashboard, moves longitudinally inwardly, vertically upwardly and laterally into the compartment. The intrusion of the dashboard is such that it typically rotates relative to the A-pillar on the opposite side of the vehicle. There is currently no sled-test apparatus or method which can reliably simulate the conditions of this type of cabin-intrusion scenario.

SUMMARY

It is an object of the present invention to provide an improved sled test apparatus for simulating a vehicle crash.

According to the present invention, there is provided a sled test apparatus for simulating a vehicle crash, the apparatus having a sled carriage and a test buck, the sled carriage being mounted for linear movement along a test axis and the test buck including a first structure mounted to the carriage for guided movement relative to the carriage, and a second structure mounted to the carriage, and wherein the first structure is configured to move relative to the second structure during said guided movement; wherein the first structure is pivotally mounted to the carriage for pivotally guided movement relative to the carriage about a vertical pivot axis.

Conveniently, the test buck is configured to represent the cabin of a motor vehicle and is mounted relative to the carriage such that the longitudinal axis of the cabin which it represents makes an acute angle to the test axis.

Preferably, the first structure is configured to move relative to the second structure in response to the carriage moving past a predetermined point along the test axis.

Advantageously, the first structure is configured to move relative to the second structure upon deceleration of the carriage.

Conveniently, the first structure may comprise a plurality of separate parts configured to sequential movement relative to one another during said guided movement.

Advantageously, the apparatus further includes an actuating brake configured to decelerate the carriage in a manner effective to trigger said guided movement and thereby move the first structure relative to the second structure.

Preferably, said actuating brake includes a stop member and an actuating member, the stop member being separate from the carriage and mounted in a position which is at least initially fixed relative to said test axis, and the actuating member being carried by the carriage and mechanically connected to the first structure, wherein the stop member is arranged to engage the actuating member as the carriage moves past said predetermined point and thereby move the actuating member relative to the carriage so as to move said first structure relative to the carriage and the second structure.

Conveniently, said stop member is mounted for energy-absorbing movement relative to said test axis when engaged by the actuating member.

Advantageously, said actuating member is mounted for linear movement relative to said carriage, in a direction substantially parallel to said test axis.

Conveniently, said actuating member is mounted to one side of the carriage, in spaced relation to the test axis.

Preferably, the actuating member is slideably received in an elongate guide member carried by the carriage.

Advantageously, said actuating member is connected to said first structure via a mechanical linkage.

Conveniently, the apparatus further includes at least one additional brake, the or each said additional brake being configured to decelerate the carriage independently of the actuating brake.

Advantageously, the second structure is mounted in a fixed position relative to the carriage.

The second structure may include a vehicle seat and/or a vehicle door.

The first structure may include a vehicle dashboard or instrument panel and/or a vehicle A-pillar.

So that the invention may be more readily understood, and so that further features thereof may be appreciated, embodiments of the invention will now be described by way of example with reference to the accompanying drawings in which further areas of applicability will become apparent from the description provided herein. The description and specific examples in this summary are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

Example embodiments will now be described more fully with reference to the accompanying drawings. The following description is merely exemplary in nature and is not intended to limit the present disclosure, application, or uses, It should be understood that throughout the drawings, corresponding reference numerals indicate like or corresponding parts and features.

Figure 1:
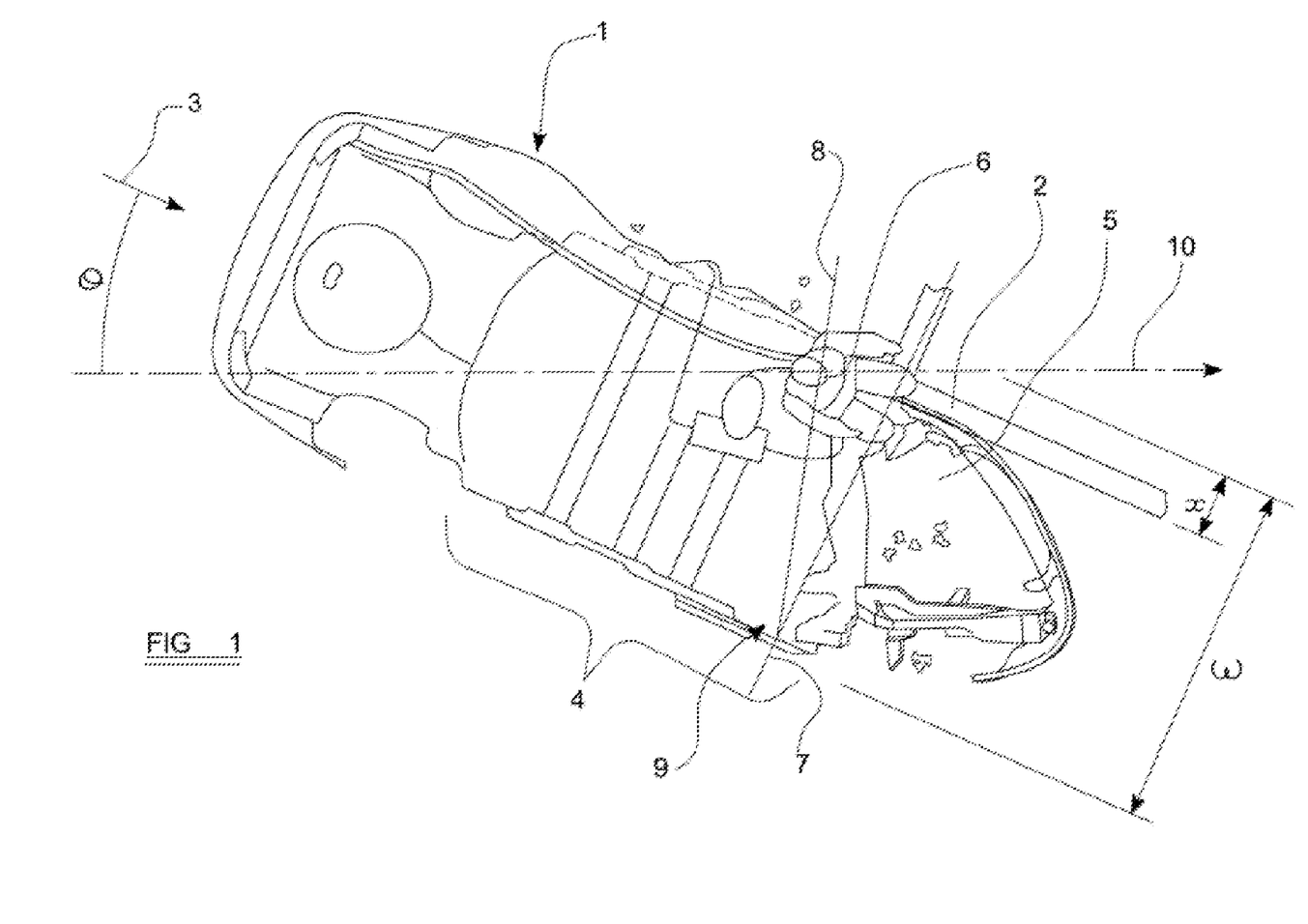
FIG. 1 is a schematic drawing showing the structure of a motor vehicle, viewed from above, involved in a frontal impact with an offset barrier.

Turning now to consider the drawings in more detail, FIG. 1 shows the structure of a motor vehicle 1 viewed from above, the vehicle being involved in a frontal impact with a barrier 2. The vehicle 1 is shown shortly after colliding with the barrier 2 whilst driving forwardly towards the barrier in a direction indicated generally by arrow 3. As will be appreciated, the overlap x between the barrier and the vehicle is significantly less than the full width w of the vehicle. Furthermore, the overlap x is actually less than ⅓ w, which means that the impact illustrated in FIG. 1 is categorised as a "small overlap" (or "small off-set") impact of the type discussed above.

As illustrated in FIG. 1, the impact of the vehicle 1 with the barrier 2 causes the barrier to intrude into the cabin area 4 of the vehicle as the front region of the vehicle structure is deformed. More particularly, the intrusion of the barrier 2 causes the dashboard or instrument panel to move inwardly of the cabin, relative to the driver or front-seat passenger 6 on the side of the impact. The original and undeformed position of the dashboard or instrument panel is represented schematically in FIG. 1 by line 7, whilst line 8 represents the deformed position of the dashboard. As will thus be seen, the dashboard or instrument panel has been moved significantly towards the driver or passenger 6 on the side of the impact, effectively being moved pivotally about the A-pillar region 9 of the vehicle on the opposite side of the vehicle Of course, the frontal impact of the vehicle 1 with the barrier 2 is effective to decelerate the vehicle and hence cause the driver or passenger 6 to move forwardly relative to the structure of the vehicle under inertia. More particularly, due to the off-set nature of the impact with the barrier, the driver or passenger 6 is urged forwardly in a direction represented by the movement axis 10, which makes an acute angle θ relative to the driving direction 3.

The apparatus of the present invention is designed to simulate the crash scenario represented in FIG. 1.

Figure 2:
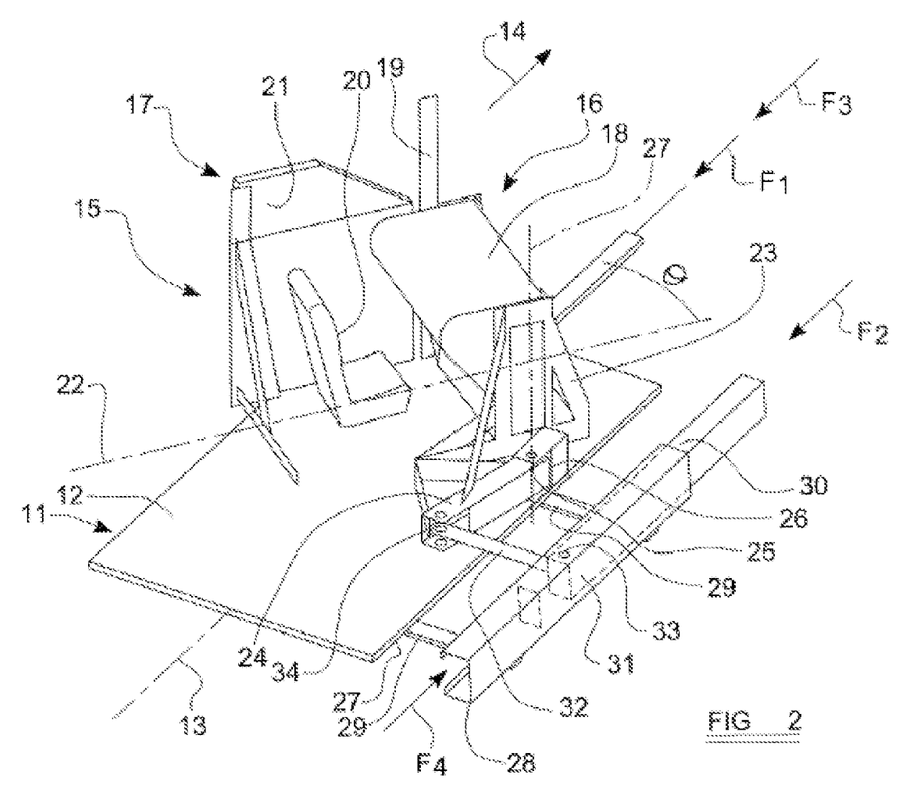
FIG. 2 is a schematic perspective view showing a sled test apparatus in accordance with an embodiment of the present invention.

FIG. 2 illustrates an apparatus in accordance with the present invention in schematic form. The apparatus includes a sled carriage 11 which defines a generally planar support surface 12 of rectangular form. The carriage 11 is mounted for linear sliding movement along a test track (not shown in FIG. 2) defining a test axis 13. The sled carriage 11 is configured to be driven along the test track at a controlled test speed in the direction indicated by arrow 14.

A test-buck 15 is mounted on the support surface 12 of the carriage 11. The test-buck 15 is configured to represent the cabin 4 of a motor vehicle 1. It will thus be appreciated that the precise form and configuration of the test-buck will depend on the type of vehicle (e.g. the specific make and model) for which simulated crash-tests are to be conducted.

The test-buck 15 comprises two discrete structures, namely a first structure 16 and a second structure 17. In the particular embodiment illustrated in FIG. 2, the first structure 16 is configured to take the form of a dashboard or instrument panel 18 in combination with an A-pillar 19 representative of the particular type of vehicle to be tested. The A-pillar is fixedly secured to one end of the dashboard 18. The second structure 17 of the embodiment illustrated in FIG. 2 is configured to take the form of a driver's seat 20 and a adjacent driver's door 21 representative of the vehicle to be tested.

It will be noted that the first and second structures 16, 17 are shown in FIG. 2 arranged relative to one another so as to represent the cabin 4 of a motor vehicle, such that the longitudinal axis 22 of the cabin makes an acute angle θ to the test axis 13 along which the carriage 11 is driven. Thus, when the carriage and test-buck 15 are driven along the test track in the direction indicated by arrow 14 and decelerated (in a manner which will be described in more detail below) so to simulate the vehicle colliding with an obstacle, a crash-test dummy (not shown in FIG. 2) seated in the seat 20 will be caused to move generally forwardly relative to the test-buck 15 under the force of inertia, but in a direction substantially parallel to the test axis 13. The dummy will thus move in a direction making an acute angle θ to the longitudinal axis 22 of the cabin. It will thus be appreciated that arranging the test-buck 15 such that its longitudinal axis 22 makes an acute angle θ to the test axis 13 is effective to simulate the angled movement of the vehicle occupant 6 relative to the cabin 4 of the vehicle 1 as illustrated in FIG. 1.

It is important to note that the manner in which the first and second structures 16, 17 are mounted to the carriage 11 is different. The second structure 17 is fixedly mounted to the carriage 11 so as to adopt a fixed position relative to the carriage. In the particular embodiment illustrated in FIG. 2, the seat 20 and the side door 21 are thus mounted in fixed positions on the support surface 12. In contrast, the first structure 16 is mounted to the carriage 11 for guided movement relative to the carriage, and thus also relative to the fixed second structure 17. In the embodiment illustrated in FIG. 2, the first structure 16 is pivotally mounted to the carriage 11 for pivotally guided movement relative to the carriage, as will be described in more detail below. It is to be appreciated that FIG. 2 shows the dashboard 18 and A-pillar 19 of the first structure 16 in their initial positions representative of the normal condition of the vehicle cabin 4 before any crash or impact.

As shown in FIG. 2, the end of the dashboard 18 opposite to the A-pillar 19 is mounted to a support frame 23. The support frame 23 comprises an elongate rigid drive beam 24 which is located generally adjacent but spaced slightly above the support surface 12 of the carriage. The support frame 23 is pivotally mounted via a first pivot 25 to an upstanding support bracket 26 which is fixedly mounted to the support surface 12 along the side edge 27 of the carriage remote from the door 21 of the second structure 17. The dashboard 18 and the attached A-pillar 19 are thus mounted to the carriage 11 for pivotal movement about a vertical pivot axis 27. The vertical axis 27 is positioned so as to correspond to the notional position of an A-pillar on the opposite side of the vehicle cabin to the A-pillar 19 on the side of the simulated impact. As will be explained in more detail below, the first buck structure 16 is arranged to be driven from the initial position illustrated in FIG. 2 to a crash position in order to simulate the pivotal movement of the dashboard from position 7 to position 8 shown in FIG. 1.

The carriage 11 incorporates an elongate guide channel 28 which is mounted in spaced relation to the side edge 27 of the carriage. The guide channel is parallel to the test axis 13. In the embodiment illustrated in FIG. 2, the guide channel is supported by a pair of spaced apart support beams 29. The guide channel is open along the side facing the carriage, and in the embodiment illustrated in FIG. 2 has a generally C-shaped cross-sectional profile.

An actuating member in the form of an elongate and preferably hollow piston 30 is received within the guide channel 28 as a close sliding fit. The rear end 31 of the piston is connected to one end of a link arm 32 via a second pivot 33. The opposite end of the link arm 32 is connected to the rear end of the drive beam 24 via a third pivot 34. As will be appreciated, rearwards movement of the piston 30 within the guide channel 28 is thus effective to move the link arm 32, which in turn moves the drive beam 24 and the entire first structure 16 of the test-buck. This movement will be explained in more detail below.

The test apparatus further includes a brake arrangement (not shown in FIG. 2) which is arranged and configured to decelerate the sled carriage in a controlled manner in order to simulate the deceleration of a vehicle hitting an off-set obstacle in the manner illustrated in FIG. 1.

More particularly, the apparatus includes a first brake configured to apply a first decelerating force F1 to the moving sled carriage 11. The first brake is configured to decelerate the carriage over a stop-distance representative of the deformation arising from the front crumple zone of the motor vehicle being simulated. Typically this stop distance will be of the order of 1.5 m.

As will be appreciated, as the sled carriage 11 and the test-buck 15 is driven along the test track in the direction indicated by arrow 14, the piston 30 will be stationary relative to the guide channel 28 in which it is mounted, and thus the first structure 16 will be stationary relative to both the carriage 11 and the second structure 17. However, a second brake is provided which applies a second decelerating force F2 directly to the piston 30 as the carriage reaches a predetermined point along the test axis 13. The second brake thus serves to urge the piston 30 rearwardly into the guide channel 28 as the carriage continues to move along the test track. As indicated above, and as will be explained in more detail below, this movement of the piston 30 within the guide channel 28 is effective to move the first structure 16 of the test-buck in a manner which simulates the effect of intrusion into the vehicle cabin through collision with an offset obstacle. The second brake which applies the force F2 to the piston 30 can thus be considered to represent an actuating brake as it is configured to decelerate the carriage 11, and more directly the piston 30, in a manner which is effective to actuate movement of the first structure 16 of the test-buck.

A third brake is provided which is configured to apply a third decelerating force F3 to the carriage shortly after the second brake applies its force F2 to actuate movement of the first structure 16. The third brake can thus be considered to represent a main brake of the apparatus, and it is intended to simulate the scenario of the vehicle's front crumple zone becoming consumed through collision with the obstacle and a stiff stopping pulse being applied to the vehicle cabin. The third brake thus applies a highly decelerative force to the sled carriage 11 in addition to the forces F1, F2 applied by the first and second brakes.

A fourth brake may also be provided, the fourth brake being configured to apply a stopping force F4 to the actuating piston 30, and thus stop further movement of the actuating piston 30 relative to the guide channel 28, thereby defining an end-point to the relative movement of the first structure 16.

Figure 3:
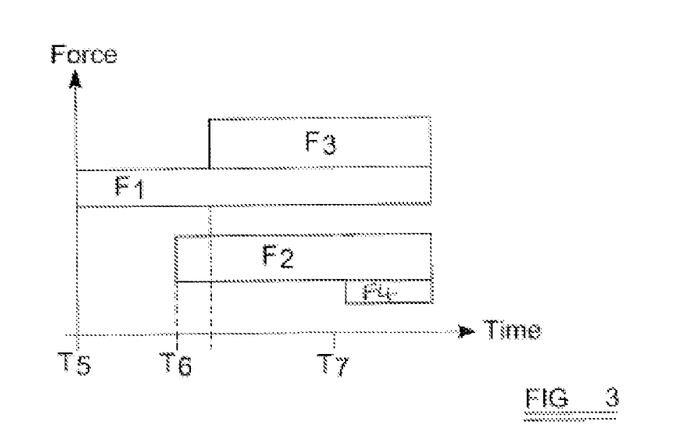
FIG. 3 is a plot of force against time, and which shows discrete stages in which the sled carriage of the arrangement of FIG. 2 is decelerated in use.

FIG. 3, which represents a plot of force against time, illustrates the relative timing and strengths of the forces F1, F2, F3, F4 applied by the four brakes.

Operation of the test apparatus of the present invention during a sled-test will now be described in further detail with specific reference to FIGS. 4 to 7 which show a preferred embodiment of the apparatus. The same reference numerals are used to denote identical or equivalent components or movements. However, FIGS. 4 to 7 show the apparatus in more detail. In particular, it can be seen that the sled carriage 11 is mounted for movement along a test track comprising a central primary rail 35 which supports the weight of the carriage 11, and a pair of spaced apart side rails 36, 37.

Each side rail 36, 37 is provided with a pair of adjacent friction brakes 38. The friction brakes 38 are mounted on the side rails for energy absorbing sliding movement relative to the side rails. The friction brakes 38 are shown in their initial positions in FIG. 4, and form part of the first brake mentioned above. In addition, the side rail 37, which is located generally below the guide channel 28, is also provided with another friction brake comprising a stop member 39. The stop member 39 is also mounted on the rail 37 for energy absorbing sliding movement relative thereto, and initially adopts a fixed position relative to the test axis 14. The stop member 39 carries a shaft 40 which extends rearwardly, towards and in alignment with the actuating piston 30. Spaced from the free end 41 of the shaft 40, there is provided an outwardly directed flange 42. As will become clear, the friction stop member 39 forms part of the second actuating brake mentioned above, in combination with the piston 30.

Figure 4:
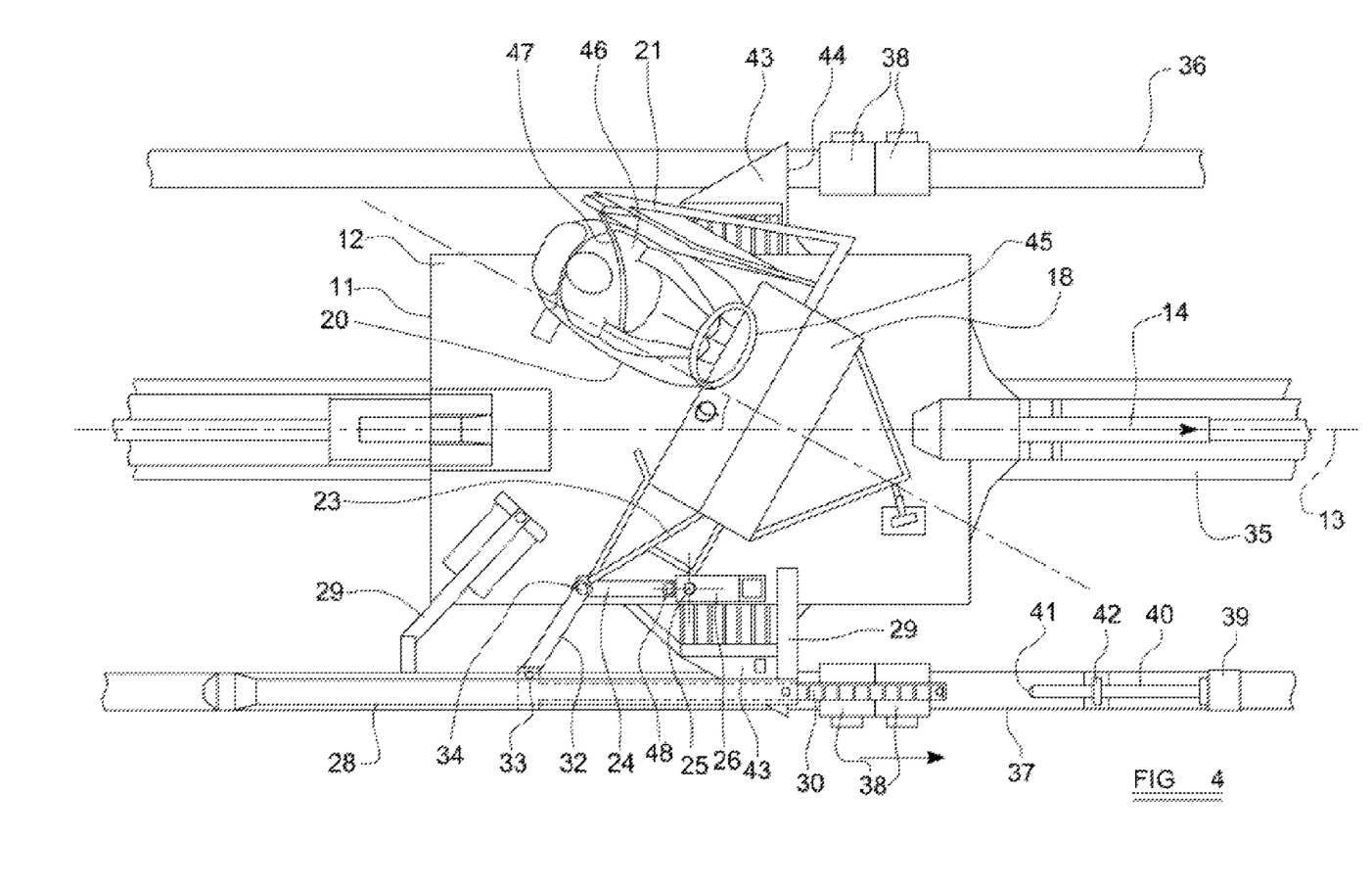
FIG. 4 is a plan view from above of a sled test apparatus in accordance with the present invention, showing the sled carriage of the apparatus prior to any decelerating forces being applied.

The carriage 11 carries a pair of wings 43, each of which extends outwardly from a respective side of the carriage so as to extend over the respective adjacent side rail 36, 37 in spaced relation thereto. Each wing 43 presents a respective forward edge 44 which is perpendicular to the test axis 13 and which is configured to cooperate with the friction brakes 38, as will be described in more detail below.

It should also be noted that in the arrangement illustrated in FIG. 4, the first structure 16 of the test-buck incorporates a steering wheel 45 mounted to the dashboard 18 in an appropriate manner representative of the vehicle to be simulated. Also, it will be seen that a crash-test dummy 46 is seated in the seat 20 and is restrained by a seat-belt 47, the seat-belt again being representative of the sort provided in the specific type of vehicle to be simulated.

Another notable difference between the embodiment illustrated in detail in FIGS. 4 to 7 and the embodiment illustrated schematically in FIG. 2 concerns the manner in which the drive beam 24 of the support frame 23 is connected to the support bracket 26. In the arrangement of FIG. 2, the forward-most end of the drive beam 24 is pivotally connected directly to the support bracket 26 via the pivot 25. However, in the arrangement of FIGS. 4 to 7 it can be seen that the forward-most end of the drive beam is instead pivotally connected to a short link (not actually visible) by a pivot 48, the link then being connected to the support bracket 26 via the pivot 25.

FIG. 4 shows the carriage 11 and associated test-buck 15 moving along the test track in the direction indicated by arrow 14, prior to the application of any decelerative forces by the above-mentioned brake arrangements. However, it should be appreciated that as the carriage continues to move in this manner the front edges 44 of the two side wings 43 will move towards the friction brakes 38 mounted on the side rails 36, 37.

Figure 5:
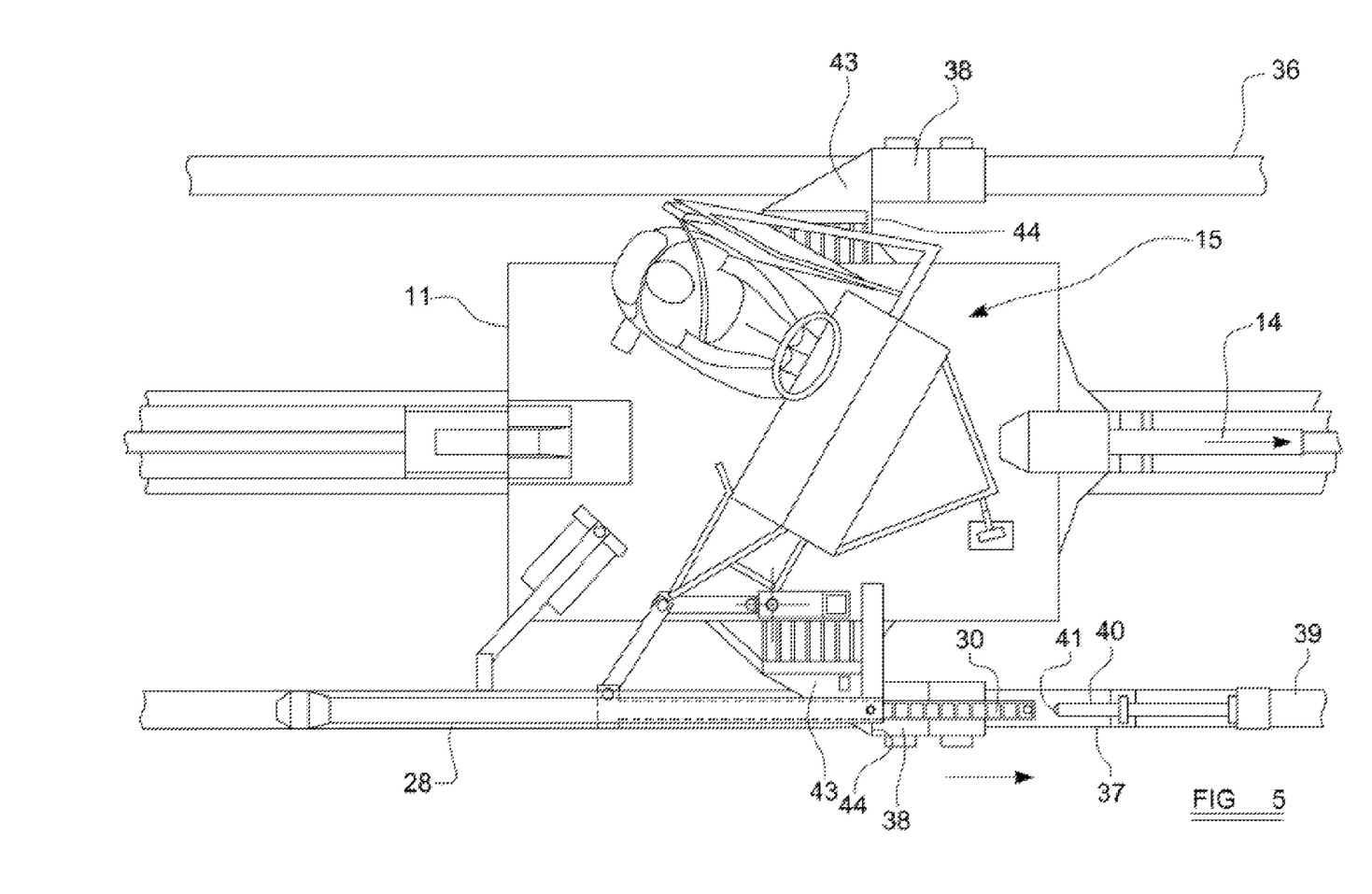
FIG. 5 is a view corresponding generally to that of FIG. 4, but which shows the apparatus in a subsequent position during a test.

FIG. 5 shows the apparatus a few milliseconds after the position shown in FIG. 4. As can be seen, FIG. 5 thus shows the front edges 44 of the side wings 43 engaging the rearmost surface of the respective friction brakes 38. This position represents the moment in time indicated at T5 in FIG. 3.

As will be appreciated, the carriage 11 and the associated test-buck 15 will continue to move relative to the test track, under inertia. This movement is thus affective to urge the friction brakes 38 along their respective side rails 36, 37. The friction acting between the brakes 38 and the rails 36, 37 is effective to apply decelerating force F1 to the carriage. During this movement, the front end of the actuating piston 30 also advances towards the free end 41 of the aligned shaft 40 of the stop member 39.

Figure 6:
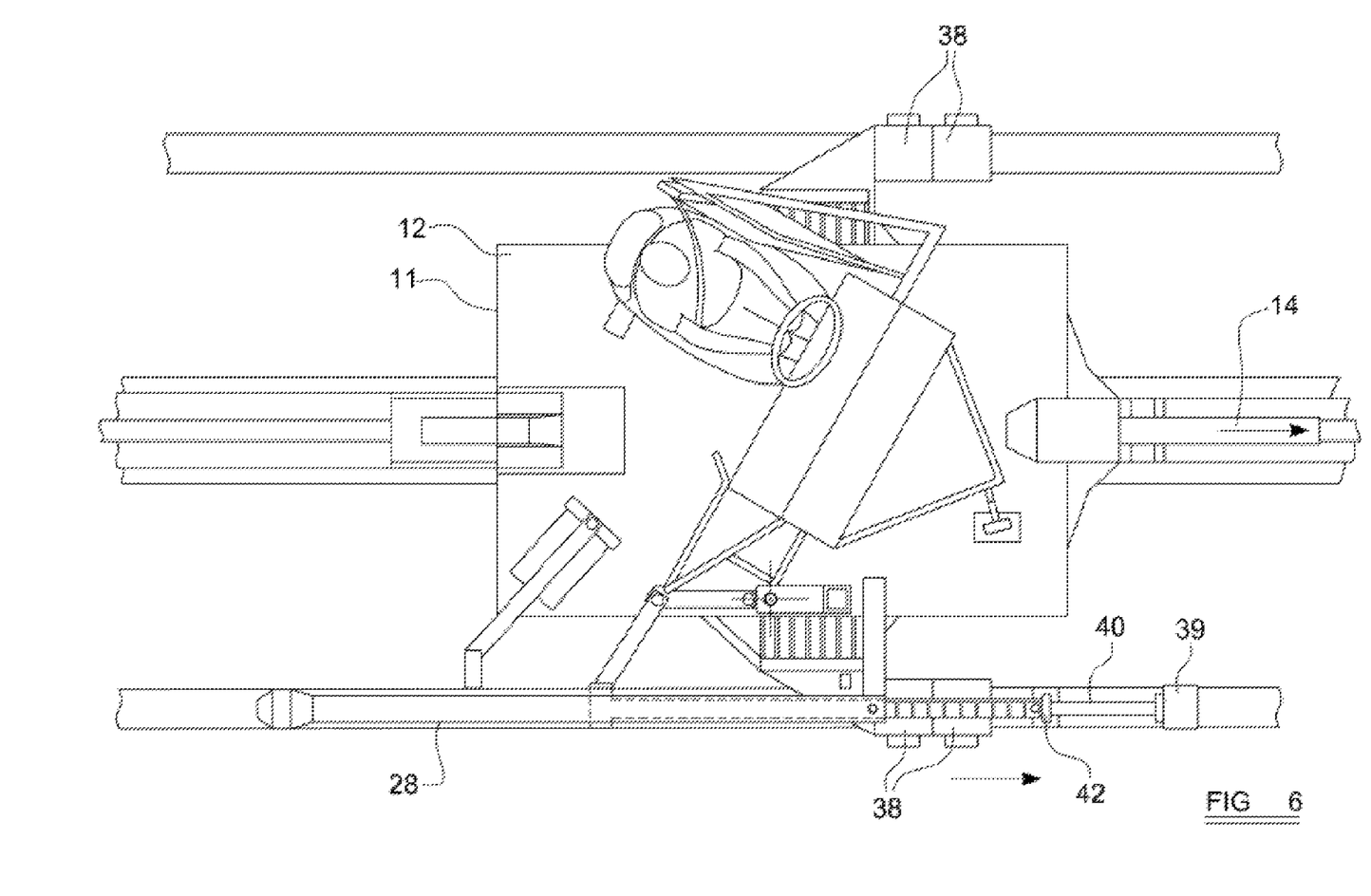
FIG. 6 is a view corresponding generally to that of FIG. 5, showing the apparatus in another subsequent position during the test.

FIG. 6 shows the apparatus a few milliseconds after the position shown in FIG. 5, and represents the moment in time indicated at T6 in FIG. 3. As can be seen, the friction brakes 38 have been urged along the side rails 36, 37. Also, it will be noted that the free end 41 of the shaft 40 has become received in the forward end of the hollow actuating piston 30. Furthermore, FIG. 6 shows the forward end of the piston 30 having been urged into engagement with the flange 42 of the shaft 40.

The continuing movement of the carriage 11 and test-buck 15 under inertia is thus effective to urge the stop member 39 along the side rail 37. The friction acting between the stop member 39 and the rail 37 is effective to apply the decelerating force F2 to the carriage, and in particular apply force F2 directly to the actuating piston 30. However, the frictional force F2 is relatively low, and so continued movement of the carriage in this manner also results in the brake 39 driving the piston 30 in to the guide channel 28 in which it is slideably mounted. The piston 30 is thus driven rearwardly relative to the support surface 12 of the carriage.

Figure 7:
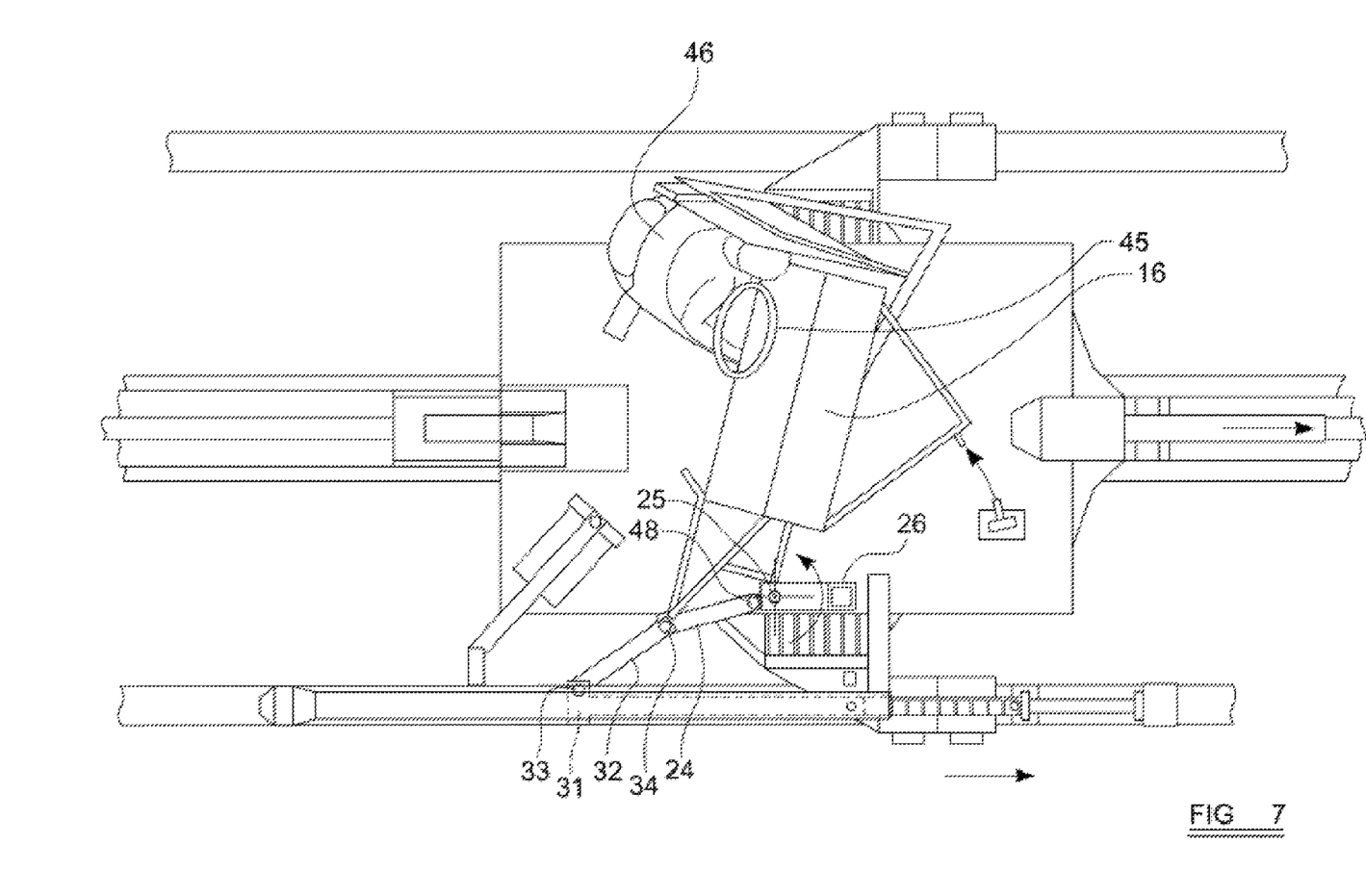
FIG. 7 is a view corresponding generally to that of FIG. 6, showing the apparatus in another subsequent position during the test.

FIG. 7 shows the apparatus a few milliseconds after the position shown in FIG. 6, and represents the moment in time indicated at T7 in FIG. 3. In particular, FIG. 7 shows the piston 30 having been driven rearwardly in the manner described above. As illustrated in FIG. 7, this movement of the piston 30 is effective to drive the outer end of the link arm 32 rearwardly. Due to the pivotal connection of the link arm 32 to the rear end 31 of the piston 30, the link arm is thus allowed to move in a pivotal manner relative to the piston 30. More particularly, the link arm 32 is effective to pull the rear end of the drive beam 24 rearwardly and outwardly relative to the carriage 11. This moves the first structure 16 of the buck (as represented by the dashboard 18, the A-pillar and the steering wheel 45) in a pivotal manner, as guided by the first pivot 25. The first structure 16 is thus driven pivotally about the pivot 25, thereby replicating the movement of the dashboard illustrated in FIG. 1, such that the region of the dashboard and the A-pillar nearest the seat 20 of the second structure 17 move towards the seat (and hence the dummy 46) in a manner which simulates an intrusion into the vehicle cabin.

Shortly after the initial movement of the first structure 16 in the manner described above, the third brake (not shown) engages and thus applies the third decelerating force F3. This is the highest of the decelerating forces applied to the carriage 11 and thus causes significant deceleration. FIG. 7, which represents the moment in time T7 after the initial application of the third force F3, thus shows the torso of the dummy 46 being thrown forwardly relative to the vehicle cabin represented by the test-buck.

Figure 8:
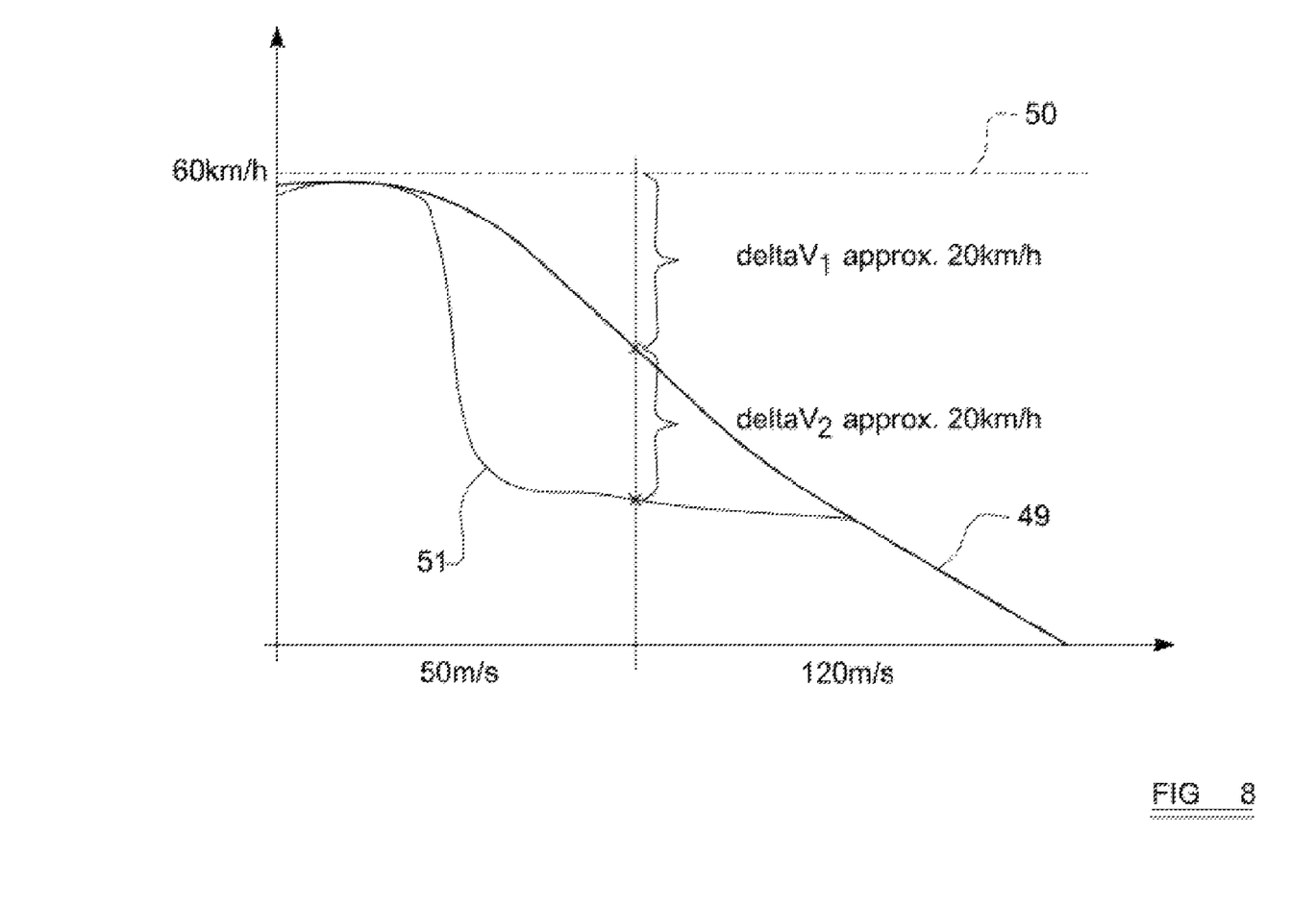
FIG. 8 is a plot of speed against time, showing deceleration curves for the sled test apparatus.

FIG. 8 is a plot of speed against time and conveniently illustrates the practical difference between the simulation offered by the apparatus of the present invention, and that possible using conventional sled test apparatus. The bold line 49 represents the deceleration profile of a sled carriage during a sled-test in which the sled is initially driven along the test axis at a speed of 60 km/h. As will be appreciated, a conventional sled carriage does not have a moveable buck structure such as the dashboard of the arrangement proposed in detail above, and so the bold line can be considered also to represent the deceleration profile of the dashboard of a conventional apparatus. The straight dashed line 50 represents a free moving mass, such as an unrestrained dummy seated on the sled carriage. As will be appreciated, at a notional time T after initial deceleration of the conventional sled carriage, the relative speed between the dummy and the fixed dashboard of the sled is represented by delta $V_1$, which in the illustrated example is approximately 20 km/h.

The fine solid line 51 on the plot of FIG. 8 represents the deceleration profile of the first structure 16 of the present invention, i.e. the dashboard 18 and the A-pillar 19 of the specific example described in detail above. As will be appreciated, upon application of the actuating brake, the moveable first structure 16 of the test buck is decelerated more rapidly than the supported sled carriage 11 itself, which is why the curve 51 dips below the curve 49. It can thus be seen that at the notional point in time T, the relative speed between the sled carriage 11 and the moving dashboard 18 is represented by delta $V_2$, which in the illustrated example is also approximately 20 km/h. It can thus be seen that a sled test conducted using the apparatus of the present invention simulates a significantly more severe crash scenario than a test using a convention sled carriage, because at time T the relative speed between the dummy and the dashboard is represented by the sum of $V_1$ and $V_2$. So, in the specific example illustrated in FIG. 8, it can be seen that the apparatus of the present invention is effective to approximately double the relative speed between the dummy and the dashboard, and thus simulates the more severe scenario of a so-called small overlap or offset impact.

Although the invention has been described above with reference to specific embodiments, it is to be appreciated that various changes and modifications may be made to the apparatus without departing from the scope of the claimed invention. For example, it is envisaged that in variants of the invention the moveable first structure 16 of the test buck 15 may be configured so as to include a plurality of separate parts arranged for sequential movement relative to one another during a sled test. For example, it is proposed that such an arrangement may include a further mechanical linkage arrangement to permit relative movement between pedals or the steering column of the simulated vehicle and the dashboard, so as to simulate scenarios such as intrusion of the pedals and/or steering column into the vehicle cabin. It has been found that such intrusions can typically occur in real vehicle crashes approximately 5-10 ms prior to intrusion of the dashboard.

Furthermore, whilst the invention has been described above with reference to a specific embodiment in which the actuating brake 39 which causes movement of the first structure 16 relative to the second structure 17 is located in spaced relation to the central test axis 14, it is envisaged that through modification of the mechanical linkage between the actuation piston 30 and the first structure 16, the actuating brake could be provided elsewhere.

Although the invention has been described above with particular reference to it being of use in simulating so-called "small overlap" or "small offset" impacts involving an overlap between the width of the vehicle and the obstacle of ⅓ or less of the vehicle width, it envisaged that the invention could also be used to simulate impacts involving a higher degree of overlap. This could be achieved by reducing the angle θ between the test axis and the longitudinal axis of the test-buck. The angle θ could even be reduced down to zero.

It is envisaged that in variants of the embodiments of the invention described herein, the seat 20 and the door 21 may actually be arranged so as to moveable with respect to one another. Such an arrangement could, for example, be configured such that the seat may move in a direction substantially orthogonal to the longitudinal axis 20 of the test-buck, so as to be effectively moveable in a substantially transverse direction towards the door. This type of arrangement could be used to simulate a side-intrusion into the cabin of a motor vehicle, which in practice is effective to move the door of the vehicle inwardly towards the adjacent seat.

Additionally, variants of the invention may be configured such that the seat is moveable in a direction substantially parallel to the longitudinal axis 20 of the test-back, so as thus to move rearwardly in response to the intrusion of the dashboard 18.

As will be appreciated by those of skill in the art, an apparatus in accordance with the present invention could be used to simulate other types of vehicle impacts, apart from the sorts of frontal impacts discussed in detail above. For example, it envisaged that the apparatus could be modified, without departing from the claimed scope of the invention, so as to simulate a rear impact, for example the sort of situation which might arise when a motor vehicle is hit from behind by a larger or heavier vehicle such as a sports utility type of vehicle. In such an apparatus, it is envisaged that the test buck 15 would be configured so as to resemble the rear part of the motor vehicle cabin, and would be driven along the test track in reverse in a backwardly facing direction. Such an arrangement would be useful in simulating the relative movement of the rear-seat of the motor vehicle in the event of a cabin intrusion form the rear.

When used in this specification and claims, the terms "comprises" and "comprising" and variations thereof mean that the specified features, steps or integers are included. The terms are not to be interpreted to exclude the presence of other features, steps or integers.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the invention in diverse forms thereof.

While the invention has been described in conjunction with the exemplary embodiments described above, many equivalent modifications and variations will be apparent to those skilled in the art when given this disclosure. Accordingly, the exemplary embodiments of the invention set forth above are considered to be illustrative and not limiting. Various changes to the described embodiments may be made without departing from the scope of the invention.

What is claimed is:

1. A sled test apparatus for simulating a vehicle crash, the apparatus comprising:
    a sled carriage mounted for linear movement along a test axis; and
    a simulated occupant cabin including a first structure mounted to the carriage for guided movement relative to the carriage and a second structure mounted to the carriage, the first structure configured to move relative to the second structure during the guided movement, the first structure pivotally mounted to the carriage for pivotally guided movement relative to the carriage about a vertical pivot axis;
    wherein the first structure includes at least one of a vehicle dashboard instrument panel and a vehicle A-pillar.

2. The apparatus according to claim 1, wherein the simulated occupant compartment is mounted relative to the carriage such that a longitudiinal axis of the cabin which it represents makes an acute angle to the test axis.

3. The apparatus according to claim 1, wherein the first structure is configured to move relative to the second structure in response to the carriage moving past a predetermined point along the test axis.

4. The apparatus according to claim 1, wherein the first structure is configured to move relative to the second structure upon deceleration of the carriage.

5. The apparatus according to claim 4, further including an actuating brake configured to decelerate the carriage in a manner effective to trigger the guided movement and thereby move the first structure relative to the second structure.

6. The apparatus according to claim 5, wherein the actuating brake includes a stop member and an actuating member, the stop member being separate from the carriage and mounted in a position which is at least initially fixed relative to said test axis, and the actuating member being carried by the carriage and mechanically connected to the first structure, wherein the stop member is arranged to engage the actuating member as the carriage moves past said predetermined point and thereby move the actuating member relative to the carriage so as to move said first structure relative to the carriage and the second structure.

7. The apparatus according to claim 6, wherein the stop member is mounted for energy-absorbing movement relative to the test axis when engaged by the actuating member.

8. The apparatus according to claim 6, wherein the actuating member is mounted for linear movement relative to the carriage, in a direction substantially parallel to the test axis.

9. The apparatus according to claim 6, wherein the actuating member is mounted to one side of the carriage, in spaced relation to the test axis.

10. The apparatus according to claim 6, wherein the actuating member is slideably received in an elongate guide member carried by the carriage.

11. The apparatus according to claim 6, wherein the actuating member is connected to the first structure via a mechanical linkage.

12. The apparatus according to claim 5, further including at least one additional brake, the or each additional brake being configured to decelerate the carriage independently of the actuating brake.

13. The apparatus according to claim 1, wherein the second structure is mounted in a fixed position relative to the carriage.

14. The apparatus according to claim 1, wherein the second structure includes at least one of a vehicle seat and a vehicle door.

* * * * *